J. W. JEWELL.
FEEDING TROUGH.
APPLICATION FILED APR. 15, 1913.

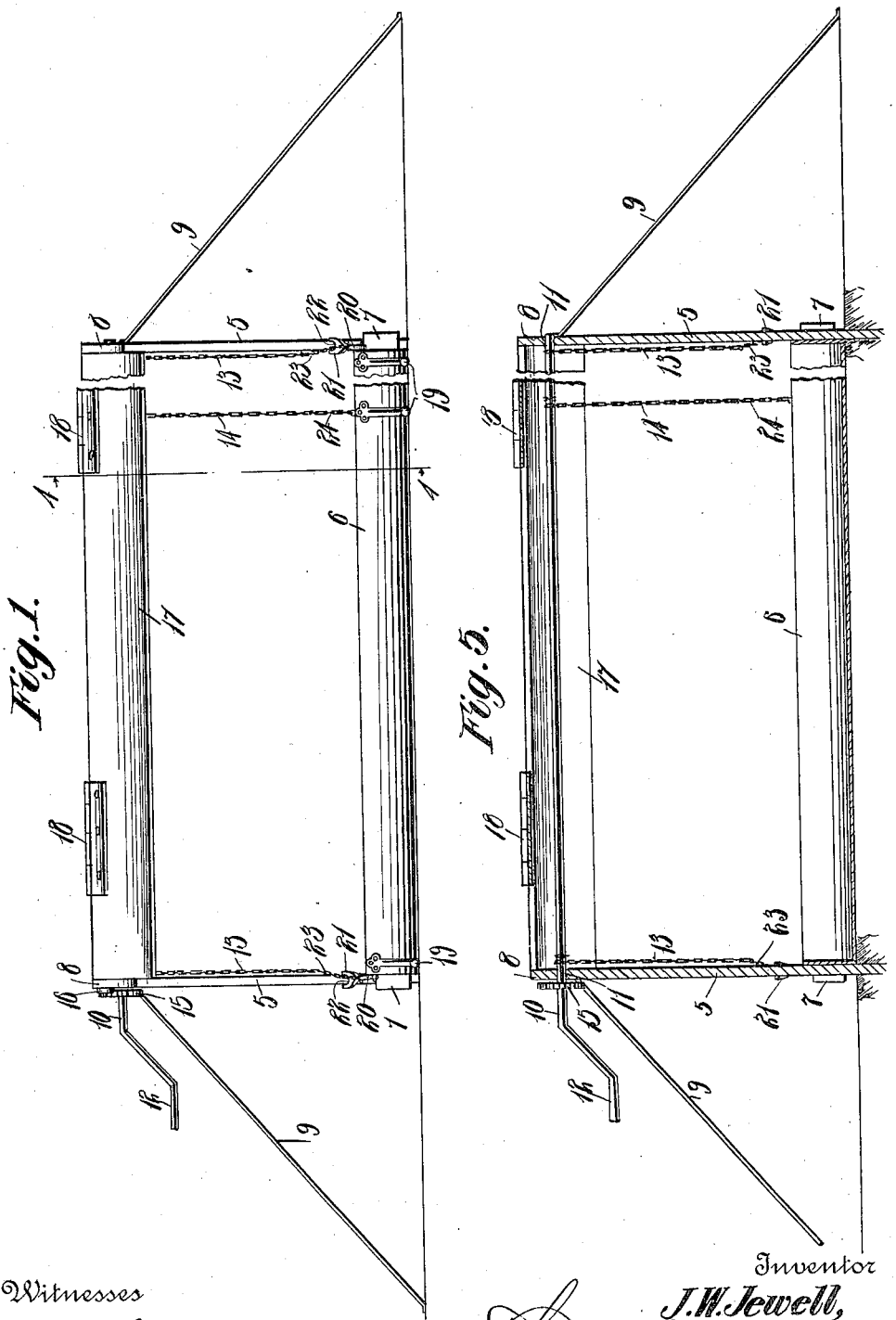

1,090,987.

Patented Mar. 24, 1914.
2 SHEETS—SHEET 2.

Witnesses
W. C. Fielding
Frank S. Ratcliffer

Inventor
J. W. Jewell,
By
Attorneys

UNITED STATES PATENT OFFICE.

JOHN W. JEWELL, OF JEWELL, IOWA.

FEEDING-TROUGH.

1,090,987.  Specification of Letters Patent.  Patented Mar. 24, 1914.

Application filed April 15, 1913. Serial No. 761,396.

*To all whom it may concern:*

Be it known that I, JOHN W. JEWELL, a citizen of the United States, residing at Jewell, in the county of Hamilton, State of Iowa, have invented certain new and useful Improvements in Feeding-Troughs; and I do hereby declare the following to be a full, clear, and exact description of the invention, such as will enable others skilled in the art to which it appertains to make and use the same.

This invention relates to new and useful improvements in feeding troughs and has particular reference to that class of troughs which are adapted to be moved to a position in which they are inaccessible to the stock.

The object of the present invention resides in the provision of a feed trough which may be raised so that it can not be reached by the stock. It is generally agreed that the best way to feed the stock grain is to soak the same, but the method presents so many disadvantages in handling the wet feed as to discountenance its use. By the provision of this trough a predetermined amount of feed may be placed in the trough and soaked while the trough is in its raised position.

A further object of the trough as regards feeding soaked grain is that only the amount of feed which the stock will eat is soaked at a time thus insuring a sanitary condition at all times.

A still further object resides in the provision of a device of the class described which is efficient in use and which may be easily operated.

With these and other objects in view, the invention resides in the novel combination, formation, and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a side elevational view of the trough, Fig. 2 is an end elevation thereof, Fig. 3 is a similar view, but showing the trough proper in a raised position, Fig. 4 is a transverse vertical sectional view taken on the line 4—4 of Fig. 1, Fig. 5 is a vertical longitudinal sectional view of the device, Fig. 6 is a detail sectional view on the line 6—6 of Fig. 2, Fig. 7 is a similar view taken on the line 7—7 of the same figure and Fig. 8 is a perspective view of one of the locking members.

Referring more particularly to the drawings, wherein is shown a preferred form of the device 5 designates a pair of spaced standards which are adapted to engage with the ends of the trough 6 by means of the guide members 7 which are secured to the said ends and provided with cut away portions on their inner faces for receiving the said standards. A vertical runway for the trough is thus provided. These standards are formed at their upper ends with enlarged heads 8 and are braced by means of suitable brace bars 9 attached at their upper ends to the said head. The means for raising and lowering the trough comprise a longitudinally extending shaft 10 which has its ends journaled in the bearings 11 formed in the heads 8 of the standards. One end of the shaft is extended and provided with a crank handle 12. Chains 13 are secured to the shaft and to the trough at each end thereof and a chain 14 is secured to the trough intermediate of its ends. These chains are wound upon the shaft to raise the trough 6. To prevent undesired retrograde movement of the shaft the same is provided adjacent one of the standards with a ratchet wheel 15, the teeth of which are engaged by a pawl 16 pivoted on the head 8.

A cover is provided which comprises two plates 17 hinged together as at 18, and resting on the standards 5 and the braces 9, one of the plates 17 being preferably fastened thereto. The other plate is left pivoted so that it may be raised for placing feed in the trough when the same is in a lifted position.

The trough is provided with a plurality of legs 19 which are adapted to engage the ground when the trough is in a lowered position to prevent the trough from rocking. Means are provided for preventing undesired vertical displacement of the trough caused by an animal engaging thereagainst which comprise bars 20 each pivoted at one end to the end of the trough and extended past the top edge of the trough and terminating in a twisted extension 21 which is provided with a V-shaped groove 22 adapted to engage the edges of the standard 5. It will be seen that any vertical pressure exerted on the trough will serve to bind the bars against the standard 5 and prevent movement of the trough. This locking mechanism is released by means of a pair of chains 23 which are connected to the lower end of the chain 13 and which comprise the connection between the chain 13 and the trough. It will be seen that when the chain 13 is pulled upwardly, the gripping ends 21 of the bars 20 will be pulled away from the standard 5, and allow the trough to ride upwardly. The chain 14 is preferably connected to the trough by means of the two short links 24 which are secured to the side edges of the trough and to the lower end of the said chain.

What is claimed is:

1. A feed trough comprising a pair of spaced uprights, a trough proper having its ends slidably engaged with the uprights, a shaft journaled in the upper ends of the uprights, means for locking the trough against undesired movement, and flexible connections between the locking means and the shaft for releasing said locking means and raising the trough upon rotation of the shaft.

2. A feed trough comprising a pair of spaced uprights, a trough proper having its ends slidably engaged with the uprights, means for locking the trough against undesired movement comprising a plurality of bars pivoted at their ends to the trough and engaging the uprights above their pivotal connection, flexible members connecting the bars and the shaft for releasing the bars from binding engagement with the uprights and raising the trough upon rotation of the shaft.

3. A feed trough comprising a pair of spaced vertical uprights, a trough proper having its ends slidably engaged with the uprights, means for locking the trough against undesired movement comprising a plurality of bars pivoted at their ends to the ends of the drum and each bar provided with a twisted extension having a V-shaped groove in its free end adapted for binding engagement with the adjacent upright above the pivotal connection of the bar and flexible members connecting the bars and the shaft whereby rotation of the shaft will release the bars from binding engagement and raise the trough proper.

4. A feed trough comprising spaced vertical uprights, a trough proper having its ends slidably engaged with the uprights, braces attached to the upper ends of the uprights, a cover comprising two plates pivoted together and supported by the uprights and braces, one of the plates being fixed to the uprights and braces, a shaft journaled in the upper ends of the uprights, flexible members connecting the shaft and the trough, means for locking the trough against undesired movement, means for preventing undesired retrograde movement of the shaft and the mouth of the trough being adapted to move to lie between the cover plates.

In testimony whereof, I affix my signature, in the presence of two witnesses.

JOHN W. JEWELL.

Witnesses:
WM. ANDERSON,
CARL N. MILLER.

---

Copies of this patent may be obtained for five cents each, by addressing the "Commissioner of Patents, Washington, D. C."